W. H. MILES, Jr.
Lather-Brush Handles.
No. 144,553. Patented Nov. 11, 1873.
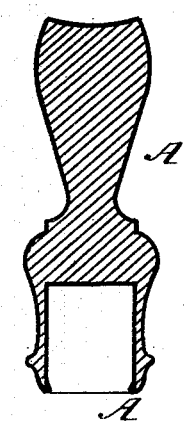
Witnesses.
Jas H Reddy
B Morris
Inventor.
Wm H. Miles Jr.

UNITED STATES PATENT OFFICE.

WILLIAM H. MILES, JR., OF BROOKLYN, NEW YORK.

IMPROVEMENT IN LATHER-BRUSH HANDLES.

Specification forming part of Letters Patent No. 144,553, dated November 11, 1873; application filed July 3, 1873.

*To all whom it may concern:*

Be it known that I, WILLIAM H. MILES, Jr., of the city of Brooklyn, in the county of Kings and State of New York, have invented a new and useful Improvement in Lather-Brush Handles and Ferrules, of which the following is a specification, reference being had to the accompanying drawing.

Lather-brush handles are usually made in two or more parts, the ferrule or socket generally of bone or horn.

The object of my improvement is to produce a good and durable lather-brush handle out of one piece of wood, by coating the entire handle and socket, inside and out, with the ordinary preparations of japan varnish or enamel, so that it shall not only be impervious to water, but shall be made stronger by the process.

The accompanying drawing represents a longitudinal section of a lather-brush handle formed of one piece of wood, A A, the japan varnish or enamel coating the whole being according to my improvement.

In carrying out my improvement, I provide a socket and handle made from a single piece of wood. I cover or coat it with the ordinary preparation of japan varnish or enamel, by immersion or otherwise, when it is allowed to drain, usually with the socket-end down, so as form a bead around the inside of the mouth of the hole. After a number have been so treated they are placed into an oven suitable for the purpose, and subjected to a temperature sufficient to harden the japan. This process is repeated several times, until a smooth hard surface is produced.

By this process, a handle made of one piece, as here shown, and coated with japan varnish, as described, is thoroughly seasoned and prevented from warping or cracking. The first and second coating soaks and permeates into the pores of the wood, and thereby toughens and strengthens the whole. The drip forming a bead on the inside of the mouth of the socket, gives greater security to the bristles, for when the ends of the bristles are cemented and put into the socket, the root-end expands out into the enlarged space. The cement becoming hard prevents the bristles from drawing out.

The improved article, produced substantially in the manner I have described, forms a strong and durable handle at one-half the expense of those in common use, and no handle like it, so far as I am aware, has ever been known or used by others.

Having thus described my invention, I claim as new and desire to secure by Letters Patent—

As a new article of manufacture a wooden lather-brush handle, with a socket for the bristles, formed of one piece of wood, and coated with japan varnish or enamel, as and for the purposes specified.

WM. H. MILES, JR.

Witnesses:
JAS. H. REDDY,
J. B. NONES.